(12) United States Patent
Shih et al.

(10) Patent No.: US 7,839,466 B2  
(45) Date of Patent: Nov. 23, 2010

(54) BACKLIGHT UNIT FOR LIQUID CRYSTAL DISPLAY

(75) Inventors: ChingWen Shih, Tainan Science Based Industrial Park (TW); ChenPin Hung, Tainan Science Based Industrial Park (TW)

(73) Assignee: Chimei Optoelectronics Corp., Tainan (TW)

( * ) Notice: Subject to any disclaimer, the term of this patent is extended or adjusted under 35 U.S.C. 154(b) by 763 days.

(21) Appl. No.: 11/233,011

(22) Filed: Sep. 23, 2005

(65) Prior Publication Data

US 2006/0132672 A1 Jun. 22, 2006

(30) Foreign Application Priority Data

Oct. 19, 2004 (TW) ............................. 93131630 A

(51) Int. Cl.  
G02F 1/1335 (2006.01)
(52) U.S. Cl. .................. 349/64; 349/61; 349/62; 349/66
(58) Field of Classification Search ............ 349/61, 349/62, 64, 66  
See application file for complete search history.

(56) References Cited

U.S. PATENT DOCUMENTS

| 6,871,982 B2 * | 3/2005 | Holman et al. ............... 362/331 |
| 2002/0113924 A1 * | 8/2002 | Saito et al. .................. 349/112 |
| 2003/0016205 A1 * | 1/2003 | Kawabata et al. ........... 345/102 |
| 2004/0120161 A1 * | 6/2004 | Hwang ....................... 362/558 |
| 2004/0239829 A1 * | 12/2004 | Yu et al. ....................... 349/61 |

* cited by examiner

*Primary Examiner*—David Nelms  
*Assistant Examiner*—Lauren Nguyen  
(74) *Attorney, Agent, or Firm*—Lowe Hauptman Ham & Berner LLP

(57) ABSTRACT

A backlight unit to effectively prevent generation of double images, having a frame, a plurality sets of light sources, at least one isolator and one diffuser. The light source sets are located within the frame and are individually driven periodically. The isolator is disposed at the bottom of the frame between adjacent light source sets. The diffuser is located on top of the frame over the light source sets and the isolator with a height larger than or equal to half the distance between the diffuser and the bottom of the frame.

7 Claims, 4 Drawing Sheets

BACKLIGHT UNIT FOR LIQUID CRYSTAL DISPLAY

BACKGROUND OF THE INVENTION

1. Field of Invention

The present invention relates in general to a light source module, and more particularly, to a backlight unit for a liquid crystal display.

2. Related Art

In modern multimedia technology, the conventional analog transmission of image information has been replaced by digital transmission. To comply with the modern life style, the multimedia applications such as video or image devices have been made very thin and light. The conventional cathode ray display, though having the advantages of fine display quality and low cost, can no longer meet with the market requirements due to the large volume and heavy weight required by the internal cathode cavity. Further, the cathode ray tube display also has the problem of high radiation that often deteriorates functions of human eyes. Therefore, recently the mature optoelectronic and semiconductor made it possible to have the flat panel displays dominating the display market. Among various types of flat panel display, the liquid crystal display characterized with low operation voltage, non-radiation scattering, light weight and small volume has become the mainstream of display product.

A typical liquid crystal display includes a liquid crystal display panel and a backlight unit. The liquid crystal display panel includes a color filter (C/F), a thin-film transistor array, and a liquid crystal layer sandwiched between two substrates. The backlight unit is operative to provide the source light required by the liquid crystal panel, so as to achieve the display effect. The thin-film transistor array formed on the substrate determines the number of pixels of the liquid crystal display. The electrode pair of each pixel provides voltage to drive the liquid crystal molecules twisting between them, so as to drive whether a light beam can propagate through or not. In addition, a specific response time is required for twisting the liquid crystal molecules to a desired orientation. Therefore, double image often appears during the time the liquid crystal molecules are driven to twist to the desired orientation. Such longer motion picture response is always an adverse effect that degrades the display quality of the liquid crystal display.

To resolve the double-image problem, a scan backlight unit has been proposed. FIG. 1 shows a schematic drawing of a conventional scan backlight unit. As shown, the scan backlight unit 104 includes a frame 110, multiple sets of light source 120, a diffuser 140 and at least one optical film 142. The light source sets 120 are located on the bottom surface of the frame 110. Each of the light source sets 120 includes three periodically driven individual light sources. The light required by the liquid crystal panel is supplied from these light source sets 120, and each light source set 120 corresponds to a specific area of the liquid crystal panel 102. The diffuser 140 is operative to evenly diffuse light emitted from the light sources 122, and the optical film 142 is used to enhance the optical quality of the backlight unit 104.

Although the generation of double images can be suppressed by periodically driving the light source sets of the scan backlight unit 104, the response time between lit up the light source set 120 and the liquid crystal molecules being twisted still exists. In addition, even when the liquid crystal molecules are sufficiently twisted, interference between different light source sets may occur. That is, the light emitted from any of the light source sets 120 may propagate to any area corresponding to other light source set to cause double image.

It is therefore a substantially need to suppress generation of double image caused by the backlight unit.

SUMMARY OF THE INVENTION

The present invention is to provide a backlight unit to prevent generation of double images so that the image quality of the liquid crystal display is enhanced.

Further, the present invention is to provide a liquid crystal display having high image quality without the generation of double images.

Accordingly, a scan-type backlight unit provided by the present invention includes a frame, a plurality of light source sets and at least one isolator. The light source sets are mounted within the frame, the light source sets being individually and periodically driven. The isolator is installed within the frame between adjacent light source sets.

The scan-type backlight unit further includes a diffuser mounted on the frame over the light source sets and the isolator. The isolator has a height larger than or equal to half the distance between the diffuser and a bottom of the frame, or the distance between a top of the isolator and a bottom of the diffuser is smaller than one half of the distance between the diffuser and the bottom of the frame. The isolator has a cross sectional area gradually decreases as the height. Moreover, the scan-type backlight unit further includes a lining block located between the isolator and a bottom of the frame.

Furthermore, the isolator includes a first isolation part mounted on a bottom surface of the frame and a second isolation part mounted on the first isolation part, and the second isolation part has a cross section smaller than or equal to that of the first isolation part. The first isolator has a cross sectional area gradually decreases as the height. The surface of the first isolator faces to the light source sets is a plane or a curve surface. The second isolation part is in the form of a planar plate.

The light source sets of the scan-type backlight unit include at least one light source which can be a cold cathode fluorescent lamp or a light-emitting diode array.

Accordingly, a backlight unit provided by the present invention includes a frame, a plurality of light source sets, at least one isolator and a diffuser. The light source sets are mounted within the frame. The isolator is installed at a bottom of the frame and between adjacent light source sets. The diffuser is mounted on the frame over the light source sets and the isolator. The isolator has a height larger than or equal to half the distance between the diffuser and a bottom of the frame, or the distance between a top of the isolator and a bottom of the diffuser is smaller than one half of the distance between the diffuser and the bottom of the frame.

Moreover, the isolator has a cross sectional area gradually decreases as the height. The scan-type backlight unit further includes a lining block located between the isolator and a bottom of the frame.

The isolator includes a first isolation part mounted on a bottom surface of the frame and a second isolation part mounted on the first isolation part, and the second isolation part has a cross section smaller than or equal to that of the first isolation part. The first isolator has a cross sectional area gradually decreases as the height. The surface of the first isolator faces to the light source sets is a plane or a curve surface. The second isolation part is in the form of a planar plate.

The light source sets of the backlight unit include at least one light source which can be a cold cathode fluorescent lamp or a light-emitting diode array.

Accordingly, a liquid crystal display provided by the present invention includes a liquid crystal panel and the above-mentioned backlight unit.

As such, the scan-type backlight unit, the backlight unit and the liquid crystal display include an isolator installed between adjacent light source sets to eliminate mutual interface between the adjacent light source sets. This ultimately suppresses double image effect caused by neighboring backlight units. Thus, the image quality can be enhanced.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

A backlight unit is provided with an isolator disposed between adjacent light source set, such that interference between the light source sets can be prevented from degrading the image quality of the liquid crystal display.

Figure 1:
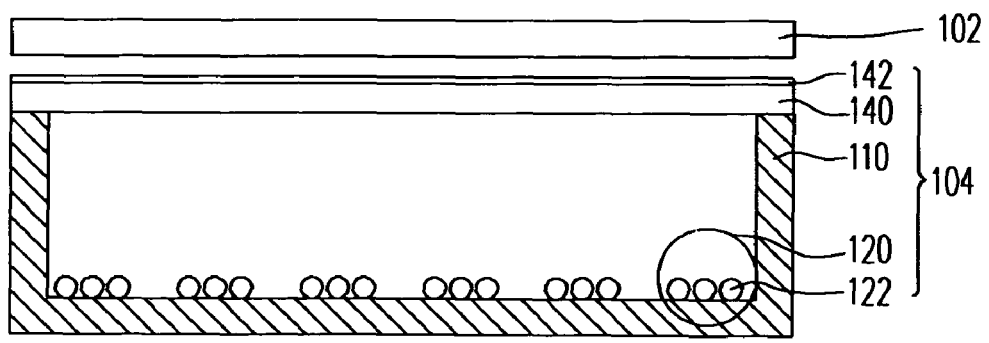
FIG. 1 illustrates a conventional scan backlight unit.
Figure 2:
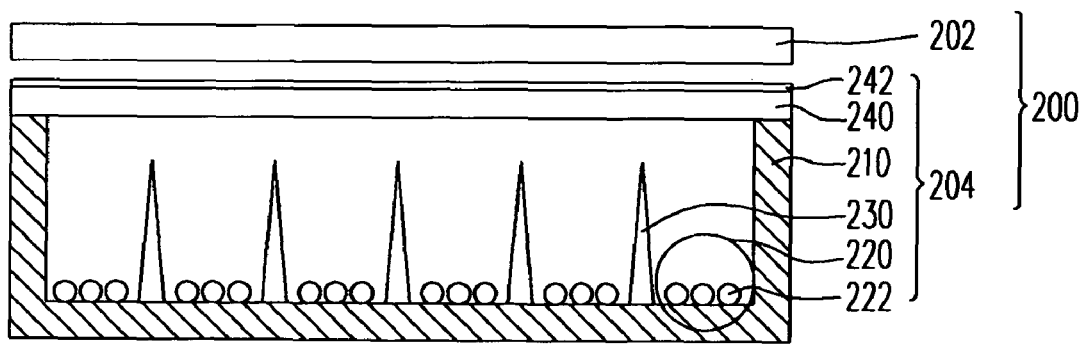
FIG. 2 is a schematic drawing of an exemplary liquid crystal display.

FIG. 2 illustrates a first embodiment of the backlight unit of a liquid crystal display. As shown, the liquid crystal display 200 includes a liquid crystal display panel 202 and a backlight unit 204. The backlight unit 204 includes a frame 210, a plurality of light source sets 220, at least one isolator 230, a diffuser 240 and at least one optical film 242. The light source sets 220 are installed on a bottom surface of the frame 210. Each of the light source set 220 includes at least one light source 222. In this embodiment, each of the light source set 220 includes three light sources 222. The light source 222 is selected from various types of light emitting devices such as cold cathode fluorescence lamp (CCFL) or light-emitting diode (LED) array. The diffuser 240 evenly diffuses light emitted from the light sources 222, while the optical film 242 is operative to enhance the optical quality of the backlight unit 204. The light source sets 220 are periodically driven to emit light propagating through the diffuser 240 and the optical film 242 and supplied to the liquid crystal panel 202 for display.

Figure 3:
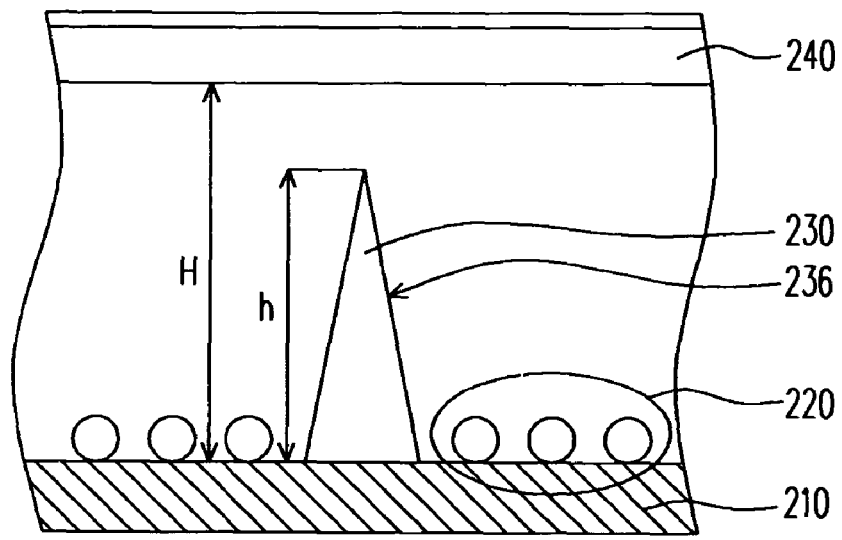
FIG. 3 is a local enlargement of FIG. 2.

FIG. 3 is a partial enlargement of FIG. 2. As shown, the isolator 230 is mounted to the bottom surface of the frame 210 between adjacent light source sets 220. The height h of the isolator 230 is larger than or equal to half of the distance H between the diffuser 240 and the bottom surface of the frame 210. In other words, the distance between the top of the isolator 230 and the diffuser 240 is smaller than half the distance H. In addition, the cross sectional area of the isolator 230 gradually increases towards the bottom surface of the frame to result in a narrower-top and wider-bottom configuration. Referring to FIG. 3, the formation of the isolation 230 reduces the possibility of interferences between the light source sets 220. The light emitted from any light source set 220 is prevented from propagating to display areas corresponding to other light source sets 220. Thereby, the double image caused by interference between light source sets 220 is greatly suppressed.

The structure of the isolator 230 is not limited to the configuration as shown in FIG. 2. It will be appreciated that as long as the isolator 230 is effective to suppress the interference, the isolator 230 can be made with any configuration.

Figure 4:
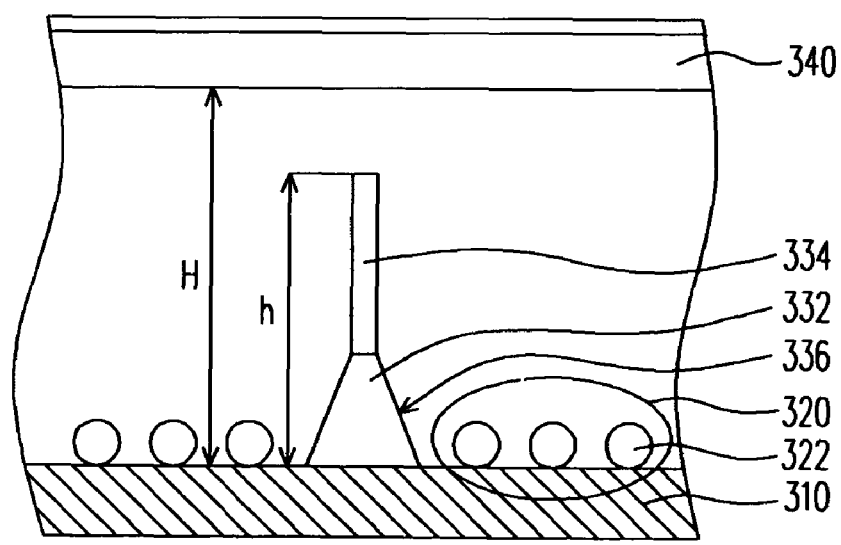
FIG. 4 shows partial schematic drawing of a backlight unit provided in a second embodiment.

FIG. 4 illustrates a second embodiment of the backlight unit. As shown, the isolator 330 includes a first isolation part 332 and a second isolation part 334. The first isolation part 332 is mounted on the bottom surface of the frame 310, while the second isolation part 334 is mounted on the first isolation part 332. Preferably, the second isolation part 334 has a cross section smaller than or equal to that of the first isolation part 332. In addition, the cross section of the first isolation part 332 gradually decreases as the height thereof increases. The second isolation part 334 may be in the form of a planar plate. The light source 322 of the light source set 320 is selected from cold cathode fluorescent lamp, for example. In this embodiment, the total height of the first and second isolation parts 332 and 334$h$ is larger than or equal to half the distance between the diffuser 340 and the bottom surface of the frame 310H. In other words, the distance between the top of the isolator 330 and the diffuser 340 is no larger than half of the distance between the diffuser 340 and the bottom surface of the frame 310. In the backlight unit 304, the remaining elements are similar to those as discussed in the first embodiment.

Referring to FIGS. 3 and 4, the existence of the isolators 230 and 330 in the backlight units 204 and 304, respectively, renders higher level of unevenness at the bottom of the frames 210 and 310; and therefore; and thus causes generation of bright lines of the liquid crystal panel.

To avoid or suppress generation of the bright lines, the slope of the isolator 230 or the first isolation part of the isolator 330 can be reduced, such that the overall height of the isolator of the isolator 230 or 330 is reduced. For the isolator 330, the reduced height can be compensated by increasing the height of the second isolation part of the isolator 332. As the cross sectional area of the second isolation part 334 is smaller, the bright lines effect is less significant even when the height thereof is increased.

The bright lines can also be suppressed by changing the reflective characteristics of the surface of the first and second isolation parts 332 and 334 of the isolator 330. For example, when the surfaces of the first and second isolation parts 332 and 334 are substantially totally reflective like a mirror surface, significant bright lines will be generated on the liquid crystal panel. When the first isolation part 332 has a white surface and the second isolation part 334 has a mirror surface, the areas of the liquid crystal panel corresponding to the second isolation part 334 appears darker, while the areas corresponding to the first isolation part 332 becomes brighter. In contrast, when the first isolation part 332 has a mirror surface and the second isolation part 334 has a white surface, the areas of the liquid crystal panel corresponding to the second isolation part 334 is brighter compared to those corresponding to the first isolation part 332. Therefore, according to specific requirement, the reflectivity of the first and second isolation parts 332 and 334 can be adjusted or rearranged to provide more evenly distributed light source.

Figure 5:
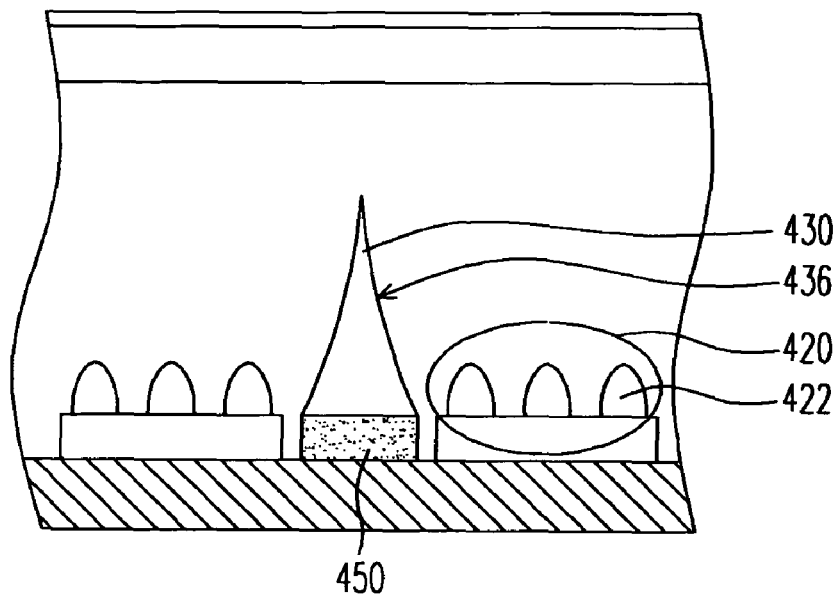
FIG. 5 shows partial schematic drawing of a backlight unit provided in a third embodiment.
Figure 6:
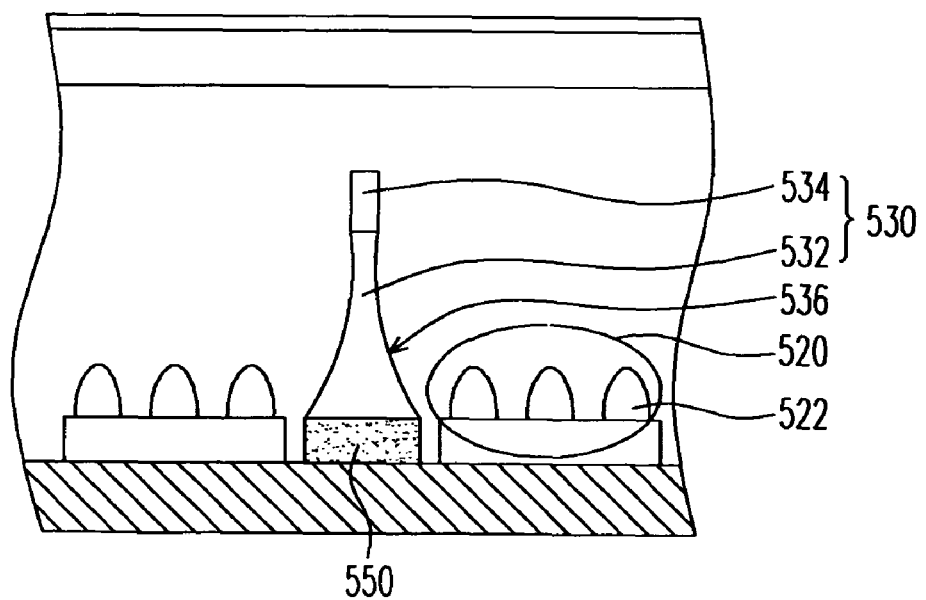
FIG. 6 shows partial schematic drawing of a backlight unit provided in a fourth embodiment.

FIG. 5 illustrates partial drawing of the backlight unit in a third embodiment, while FIG. 6 shows partial portion of the backlight unit in a fourth embodiment. Referring to FIGS. 5 and 6, the light sources 422 and 522 include light-emitting diode arrays. The light sources 422 and 522 can be selected from any suitable light emitting devices such as cold cathode fluorescent lamp. The first isolation part 532 of the isolators 430 and 530 has a curved surface facing the light source sets 420 and 520. The curved surface can also be replaced by planar surface. To elevate the bottoms of the isolators 430 and 530 with the light sources 422 and 522, a liner block 450 and 550 may be installed between the isolators 4430, 530 and the bottom surface of the frame 410 and 510.

Figure 7:
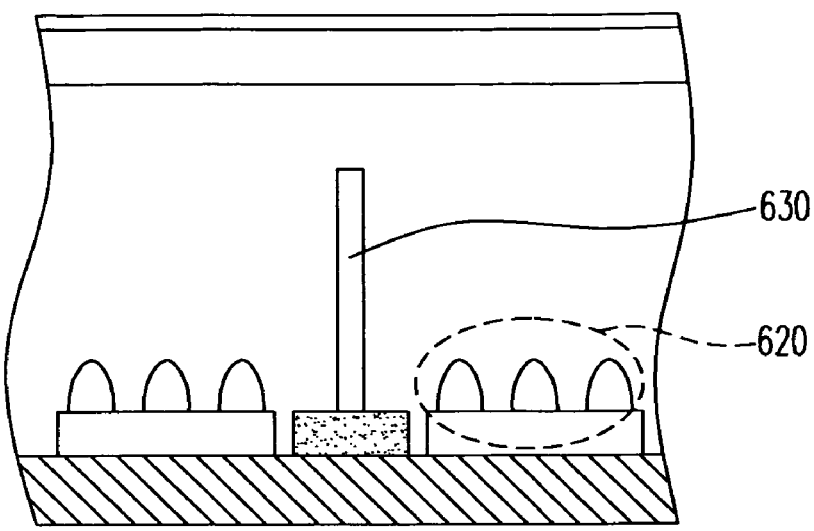
FIG. 7 shows partial schematic drawing of a backlight unit provided in a fifth embodiment.

FIG. 7 shows a partial drawing of the backlight unit provided in a fifth embodiment As shown, the planar plate of isolator 630 is adapted in the backlight unit 704 for blocking interference between the light source sets 620.

In addition, the empirical data show that ht height of the isolator may affect the response time for generating motion picture of the liquid crystal display. Table I listed the relationship between the height of the isolator, the scan duty and the response time for the motion picture provided by the liquid crystal panel. In the experiment, the distance between the diffuser and the bottom surface of the frame is 20 mm, and the scan rate indicates the actual luminescent time of the light source sets as a function of the switch period of the light source sets. From Table I, it is understood that the higher the isolator is, the shorter the average response time of the motion image is; and therefore, the higher quality the image is provided by the liquid crystal display. This is because the larger height blocks the interference more effectively.

Figure 8:
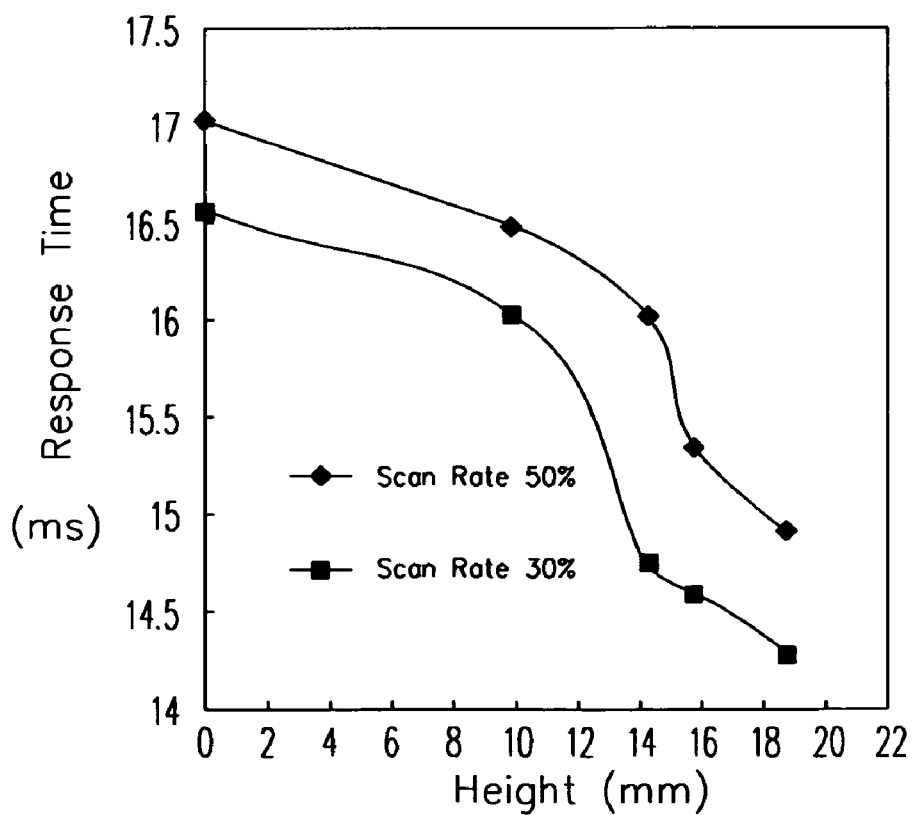
FIG. 8 provides a graph showing relationship between the height of the isolator between adjacent light source sets and the motion picture response time.

In addition, according to Table 1, the relationship between the height of the isolator and the response time of the motion image as shown in FIG. 8 can be obtained. As shown, when the height of the isolator is larger than 10 mm, the response time of the motion image is significantly shortened. As the distance between the diffuser and the bottom surface of the frame is 20 mm, the display quality of the liquid crystal display can be greatly enhanced when the height of the isolator is larger than or equal to 10 mm.

TABLE I

| Height of Isolator (mm) | Scan Rate (%) | Average Response Time for Motion Image (ms) |
| --- | --- | --- |
| 0 (Without Isolator) | 50 | 17.03 |
| 0 (Without Isolator) | 37.5 | 16.55 |
| 10 | 50 | 16.48 |
| 10 | 37.5 | 16.02 |
| 14.5 | 50 | 16.01 |
| 14.5 | 37.5 | 14.75 |
| 16 | 50 | 15.34 |
| 16 | 37.5 | 14.58 |
| 19 | 50 | 14.91 |
| 19 | 37.5 | 14.27 |

According to the above, the backlight unit includes a frame, a plurality of light source set and at least one isolator. The light source sets are individually and periodically driven. The isolator is located on the bottom surface of the frame between adjacent light source sets to effectively prevent interference between the adjacent light source sets. Thereby, the double image generated by the backlight unit can be effectively suppressed, the response time of motion images of the liquid crystal display can be shortened, and the image quality of the liquid crystal display is enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display, comprising:
   a liquid crystal panel; and
   a backlight unit including:
   a frame;
   a plurality of light source sets mounted within the frame;
   a plurality of isolators, wherein between pairs of adjacent light source sets there is one of said isolators installed for suppressing interference between said pair of adjacent light source sets, wherein each of the isolators includes
   a first isolation part, which has a first side surface and a second, opposite side surface and is mounted on a bottom surface of the frame, and
   a second isolation part, which has a third side surface and a fourth, opposite side surface and is mounted on the first isolation part; and
   a diffuser disposed on a top surface of the frame over the light source sets and the isolators,
   wherein the distance between a top of each of the isolators and the bottom surface of the diffuser is smaller than one half of the distance between the diffuser and the bottom surface of the frame;
   each of the isolators has a height less than a height of the frame between the top surface and the bottom surface thereof, and
   the diffuser is disposed on the frame over the light source sets and the isolators without being supported from below, either directly or indirectly, by any of the isolators.

2. The liquid crystal display of claim 1, wherein each of the isolators has a cross sectional area that gradually decreases away from the bottom surface of the frame.

3. The liquid crystal display of claim 1, further comprising a lining block located between each of the isolators and the bottom surface of the frame.

4. The liquid crystal display of claim 1, wherein only one of the first and second isolation parts has the respective side surfaces, upon which light from the adjacent light source sets is incident in use, that are reflective.

5. The backlight unit of claim 1, wherein the top of each of the isolators is free of direct contact with any other component of the backlight unit.

6. The liquid crystal display of claim 1, wherein the light source sets and the isolators are alternatingly and evenly distributed in the frame.

7. The liquid crystal display of claim 1, wherein light emitted from any of the light source sets is prevented from propagating to display areas corresponding to other light source sets to suppress double image generation.

* * * * *